United States Patent [19]

Marasus

[11] Patent Number: 5,737,845
[45] Date of Patent: Apr. 14, 1998

[54] METHOD AND APPARATUS FOR MEASURING DEVIATIONS OF AN AUTOMOBILE VEHICLE SEAT FROM DESIGN SPECIFICATIONS

[75] Inventor: David Marasus, Rochester, Mich.

[73] Assignee: Lear Corporation, Southfield, Mich.

[21] Appl. No.: 680,248

[22] Filed: Jul. 11, 1996

[51] Int. Cl.$^6$ .............................. G01B 5/25; G01B 11/27
[52] U.S. Cl. ................................ 33/545; 33/1 M; 33/600; 33/644; 33/555
[58] Field of Search ............................ 33/545, 1 M, 286, 33/288, 512, 515, 516, 503, 600, 644, 666, 546, 549, 551, 552, 553, 554, 555, DIG. 21

[56] References Cited

U.S. PATENT DOCUMENTS

| | | | |
|---|---|---|---|
| 5,301,003 | 4/1994 | Ikeda | 33/503 |
| 5,456,019 | 10/1995 | Dowell et al. | 33/600 |
| 5,488,781 | 2/1996 | Van Der Horst | 33/286 |
| 5,588,216 | 12/1996 | Rank et al. | 33/DIG. 21 |
| 5,621,978 | 4/1997 | Sarauer | 33/1 M |

*Primary Examiner*—Christopher W. Fulton
*Attorney, Agent, or Firm*—Brooks & Kushman P.C.

[57] ABSTRACT

A method and apparatus for measuring the characteristic dimensions of a vehicle seat for use in an automotive vehicle including the seat H-point location and determining variable data deviations of the dimensions and the H-point location from standard specifications wherein a seat to be tested is placed in a seat buck including a focused light beam generator capable of directing a light beam toward the vehicle seat after it is mounted on the seat buck, the seat buck further including a fixed target member for prepositioning the location of the light beam for zeroing the digital position coordinate read-outs prior to installation of the seat being tested on the seat buck.

5 Claims, 13 Drawing Sheets

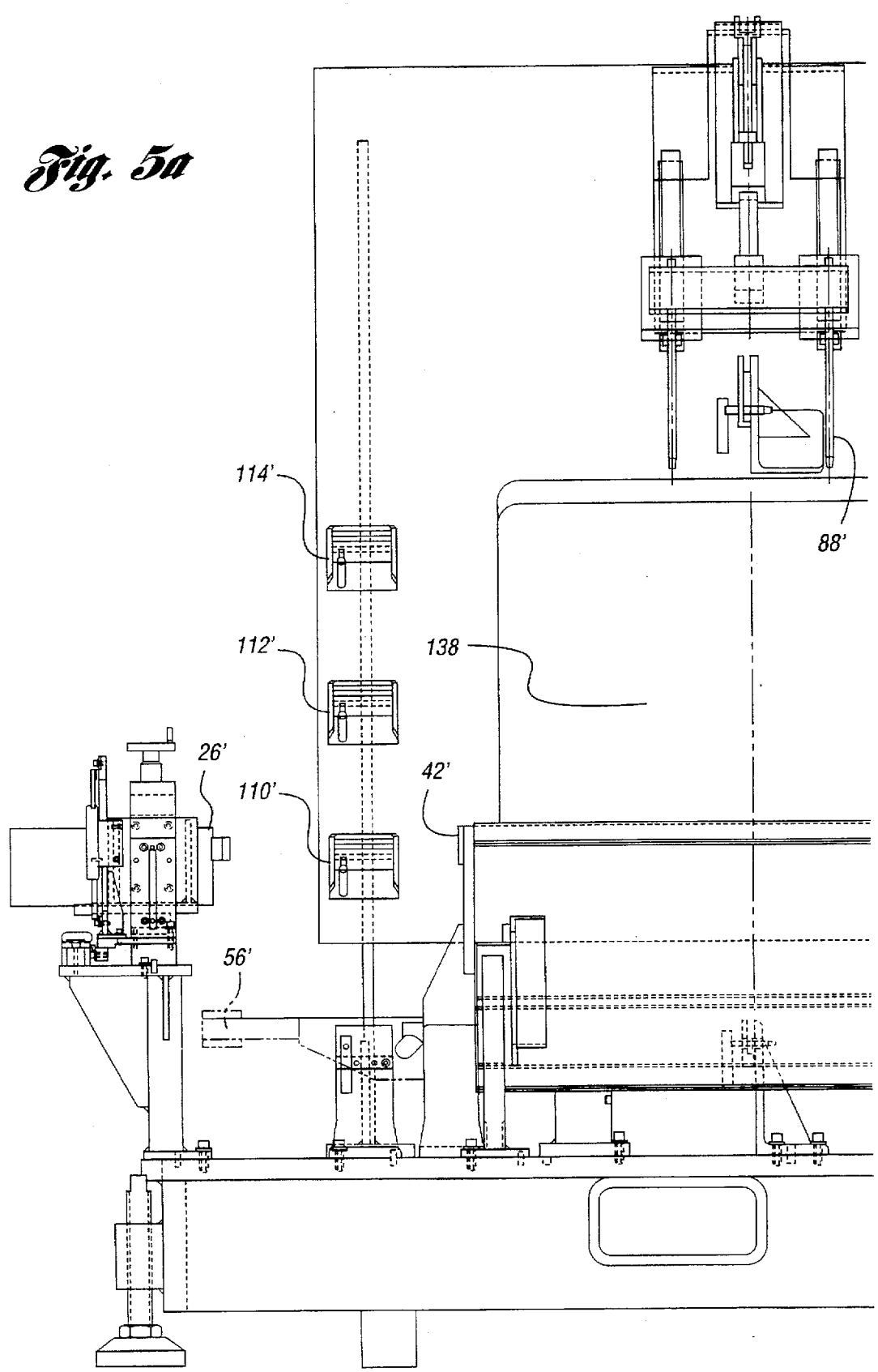

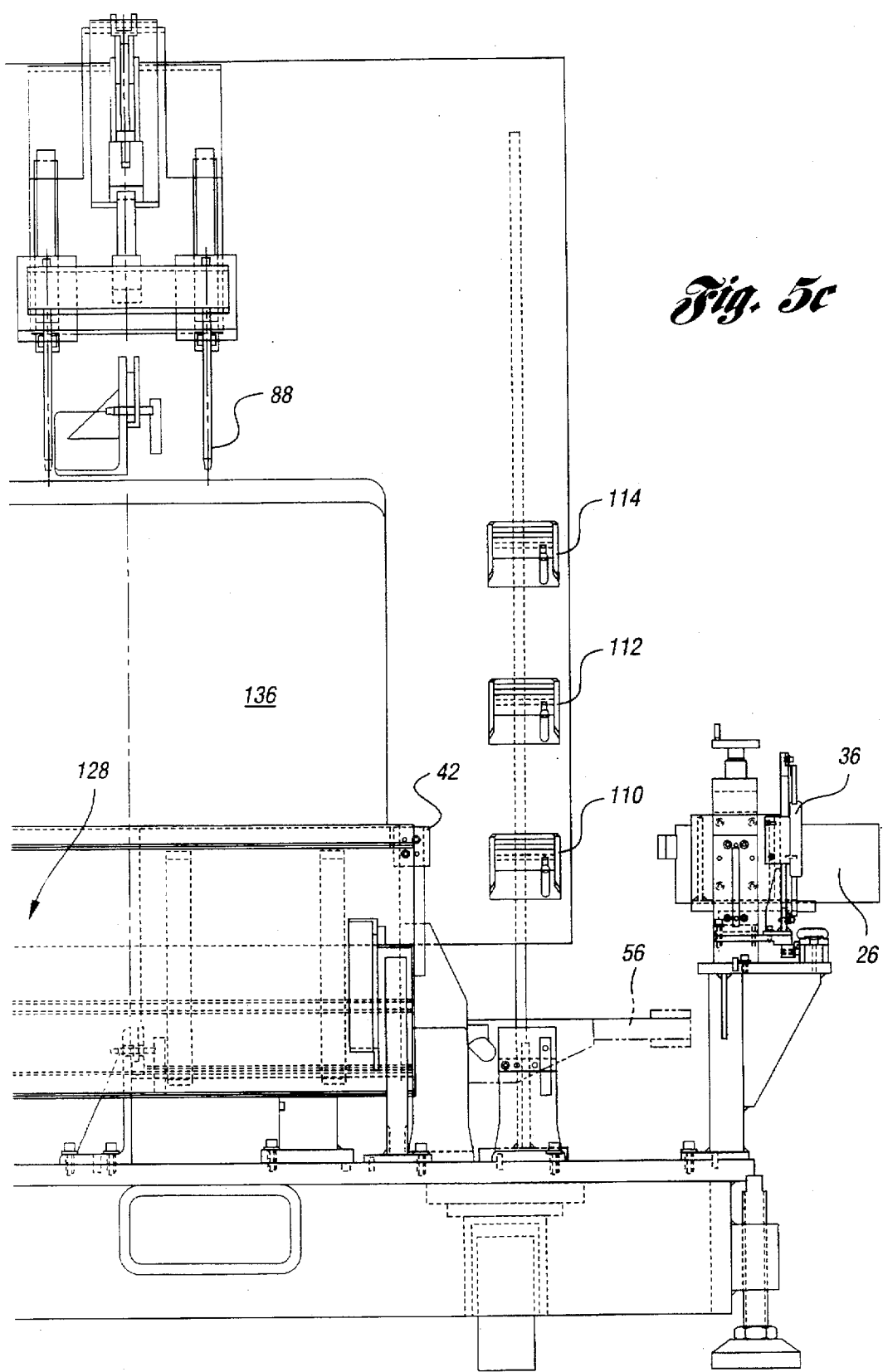

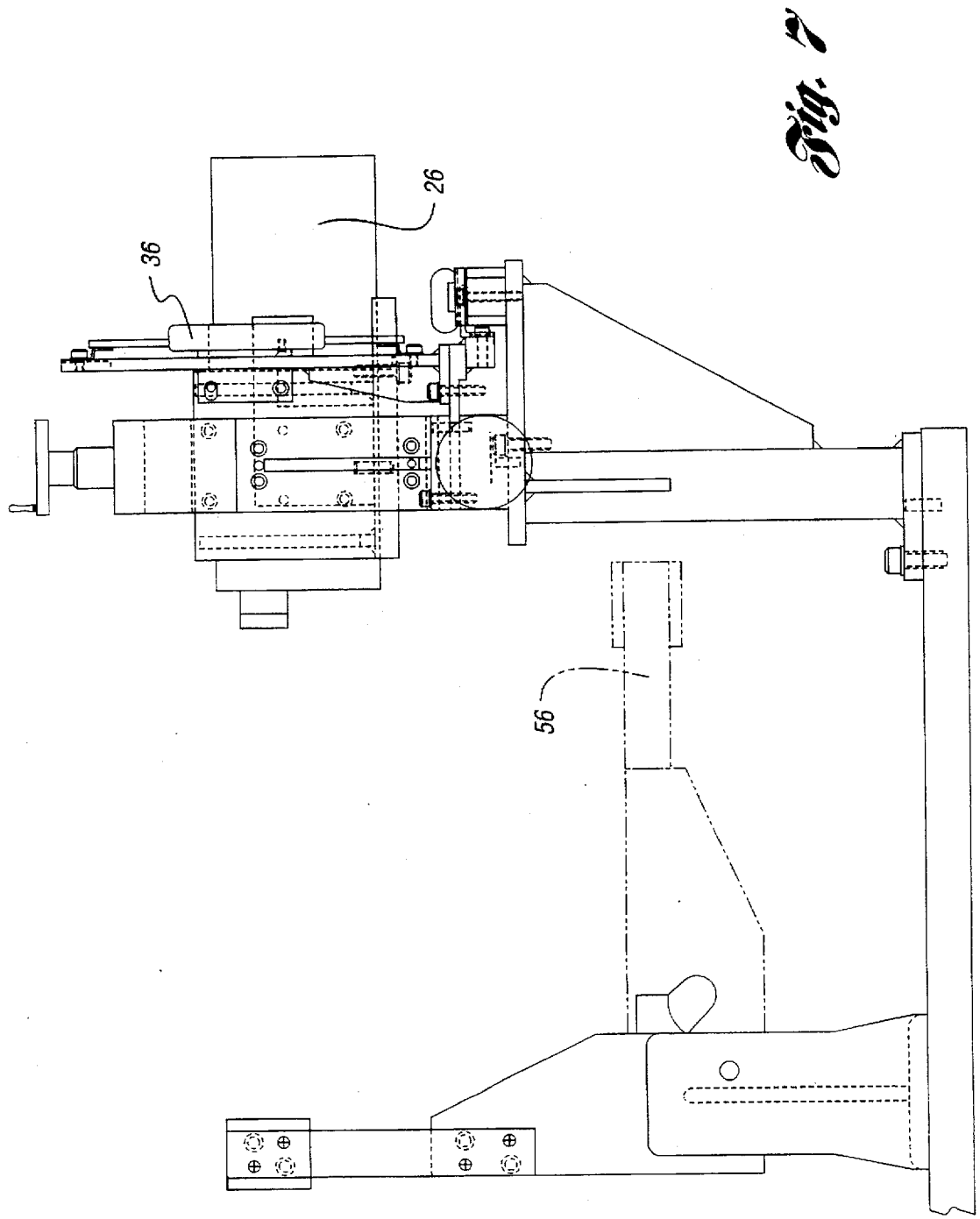

6,737,845

METHOD AND APPARATUS FOR MEASURING DEVIATIONS OF AN AUTOMOBILE VEHICLE SEAT FROM DESIGN SPECIFICATIONS

TECHNICAL FIELD

This invention relates to a method and apparatus for measuring vehicle seat H-points and other seat dimensions to determine whether manufacturing tolerances in the manufacture of the seat have been exceeded.

BACKGROUND OF THE INVENTION

In high volume production of automotive vehicles, vehicle seats are manufactured typically by an automotive supplier and delivered to an automotive assembly plant where the seats are installed as part of a final vehicle assembly procedure. In order to maintain control of the dimensions of the seat to ensure that it will properly be received in the vehicle body structure during assembly, it is necessary to make periodic checks of separately manufactured seat assemblies to compare dimensional manufacturing tolerances against a standard that is appropriate for the particular vehicle being assembled. This may be done by assembling a completed seat assembly on a test seat buck with seat attachments to a simulated floor pan. The seat buck ideally simulates a perfect vehicle environment. Seat back locators and seat attachment devices are used to secure the seat assembly within the buck whereupon three-dimensional measurements of characteristic check points on the seat assembly can be made. One of the critical characteristics of the seat is the location of the H-point, or the point on the seat that would correspond to the pivot axis of the hip of a vehicle seat occupant.

An elementary prior art method and apparatus for checking the H-point location on the vehicle seat is shown and described in U.S. Pat. No. 5,456,019, which is assigned to the assignee of my invention. The design of the '019 patent comprises a seat buck on which a vehicle seat is mounted on a support platform. A measuring pointer is fixed to the platform by a guide which will permit adjustment of the pointer in the X-axis direction. The "X" axis corresponds to the fore-and-aft direction of the vehicle center line. A vertical adjustment in the so-called Z-axis direction is achieved by a manually adjustable support member for the measuring pointer. The pointer, in turn, can be manually adjusted in a so-called Y-axis direction toward and away from the seat after the seat is mounted on the platform. The end of the measuring pointer is adjusted by means of a manual adjustment mechanism in the X-axis direction, the Y-axis direction and the Z-axis direction until it registers with the hip pivot axis or H-point on the seat. This locates and identifies the H-point in three dimensions.

The support platform of the '019 patent has a plurality of coordinate lines to facilitate the adjustment of the measuring pointer after the pointer is aligned with the vehicle seat at its predetermined position. Measurements are taken manually at each of the coordinate axis directions for locating the H-point.

The manual adjustments that are required in the seat buck disclosed in the '019 patent make precision measurements difficult or impractical. A further disadvantage of the H-point buck design of the '019 patent is the difficulty in repeating the tolerance checks on a given seat when the seat is installed, then removed and reinstalled in the H-point buck. Variations in the readings that are achieved depend upon the manual skill of the person engaged in the tolerance check.

Further, the time required to make a dimensional check of a vehicle seat using the movable measuring probe with its X, Y and Z-axis adjustment mechanisms makes the dimensional checks of vehicle seat assemblies especially impractical for high production automotive assembly operations.

BRIEF DESCRIPTION OF THE INVENTION

The improved method and apparatus of the invention makes it possible to achieve substantially greater precision in determining the H-point location and other vehicle seat characteristics while reducing the total amount of time required to conduct a seat inspection. The seat buck of the invention actually simulates a perfect vehicle environment with seat attachments for securing a test seat to a simulated floor pan. It may be located relative to a center console in a vehicle passenger compartment in the case of a front passenger seat and driver seat arrangement with an armrest between them.

Seat contour checks can be made while the seat being tested is secured to the seat buck of the invention. This is done by using templates that are supported at predetermined design locations on the seat buck.

The seat buck of the invention makes provision for a digital reading representing the precise location of test points on a vehicle seat relative to test specifications. The buck includes a light beam generator mounted on a generator support in which provision is made for adjusting a light beam generated by the generator in the direction of each of two coordinate axes. The seat buck also has an H-point target member that can be positioned prior to the data check on the seat itself. After the light beam is precisely located at the target point, the target member can be moved away to permit a measurement of deviations of the actual H-point with respect to the ideal H-point target. The deviations can be measured by digital readout units arranged on each of the coordinate axes for the light beam generator.

BRIEF DESCRIPTION OF THE FIGURES OF THE DRAWINGS

FIGS. 5a, 5b and 5c show a front elevation view of the front seat buck shown in FIGS. 4a, 4b and 4c;

FIG. 7 is an elevation view as seen from the front side of FIG. 6; and

DETAILED DESCRIPTION OF THE INVENTION

Figure 1:
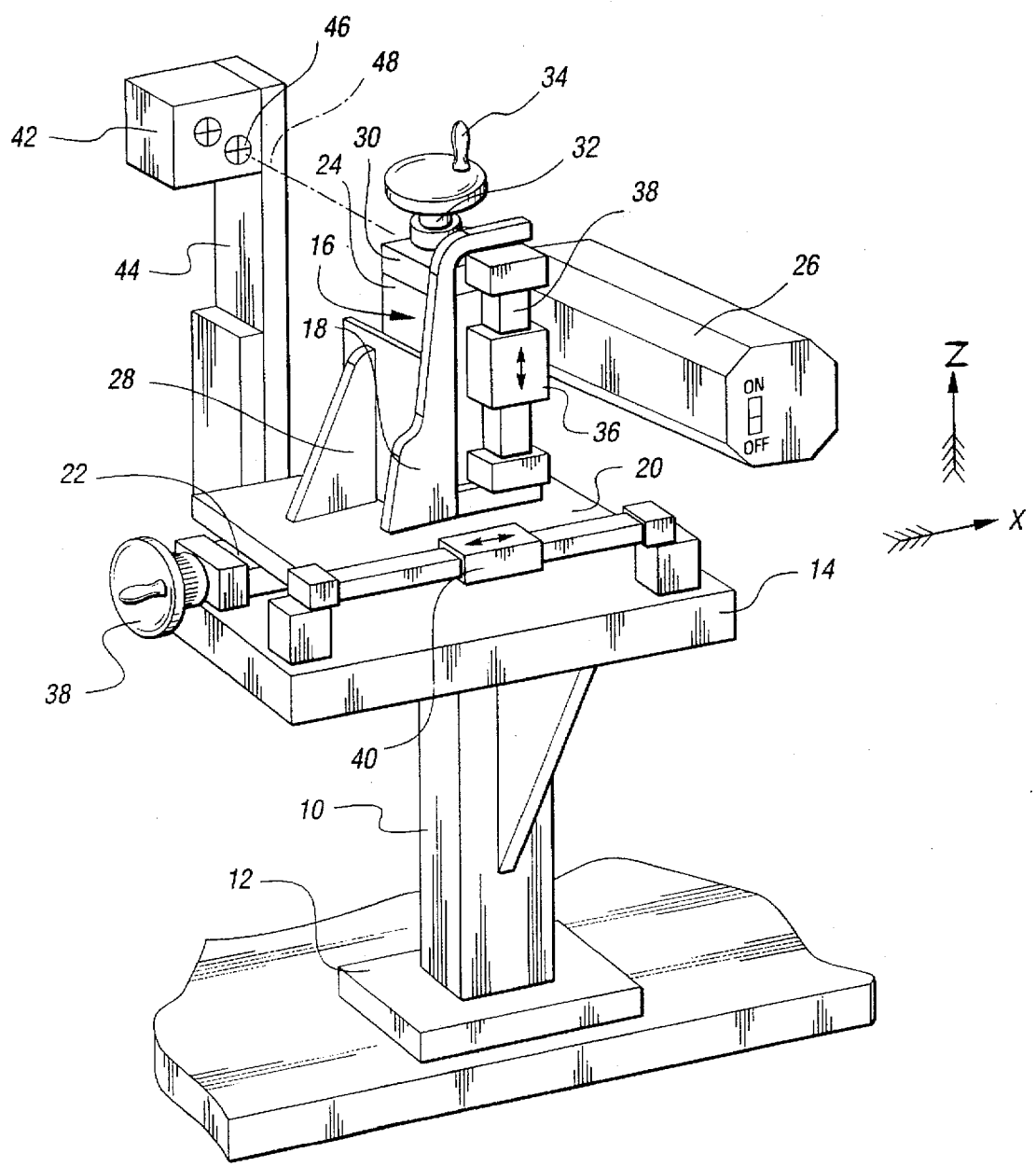
FIG. 1 is an isometric view, shown in schematic form, illustrating essential components of the H-point buck assembly of our invention.

FIG. 1 shows in schematic form a seat H-point checking setup, but the actual embodiment that will be described are seen in FIGS. 4a–7 for a front seat and in FIGS. 8a, 8b and 8c for a rear seat embodiment. The essential elements of the H-point setup are illustrated in FIG. 1. These include a pedestal 10 that can be mounted on a surface plate 12. A support platform or surface plate 14 supports a light beam generator fixture noted generally by reference character 16. It includes a support bracket 18 secured to the plate 20, the latter being supported on a movable plate 22. The fixture 16 includes a mounting plate 24 to which a light beam generator 26 is secured. Bracket 18 and companion bracket 28 provide support for guide 30 through which an adjustment shaft 32 extends. The shaft can be rotated by a manually operable crank shown at 34.

Support plate 24 carries a vertical scale digital indicator 36, which includes an adjustable member 38 that is secured to the light beam generator 26. When the crank 34 is rotated, the light beam indicator is raised and lowered in the direction of the arrow "Z". The fore-and-aft adjustment crank 38 adjusts the support 22 and the mounting fixture 16 in the fore-and-aft direction as it is rotated. The horizontal scale indicator shown at 40, which is attached to the plate 20, will record the displacement of the light beam indicator in a fore-and-aft direction, which is designated in FIG. 1 by directional arrow "X".

A target element 42 is carried by a mounting bracket 44. It includes the target H-point 46 which, when the light beam generator is located "on target", will be illuminated by the light beam generated by the generator 26. The light beam is schematically illustrated at 48. The structure illustrated in FIG. 1 would be mounted on one side of a surface plate of a seat buck which will be described with reference to FIGS. 4–7 and 8.

A seat to be checked may be mounted in the seat buck at a transverse location directly adjacent the H-point target element 42. After the light beam is targeted on the target point 46, the target element 42 is folded as will be explained with reference to FIGS. 4–7, to an inactive position so that the light beam 48 can be focused on a H-point located on the seat to be checked. If the light beam does not fall on the H-point for the seat to be checked, an error in the "X" dimension or an error in the "Z" direction or an error in each direction is indicated. Appropriate modifications and design corrections can be made to the seat so that the light beam, in a subsequent check, is in perfect alignment with the H-point on the seat.

Figure 2:
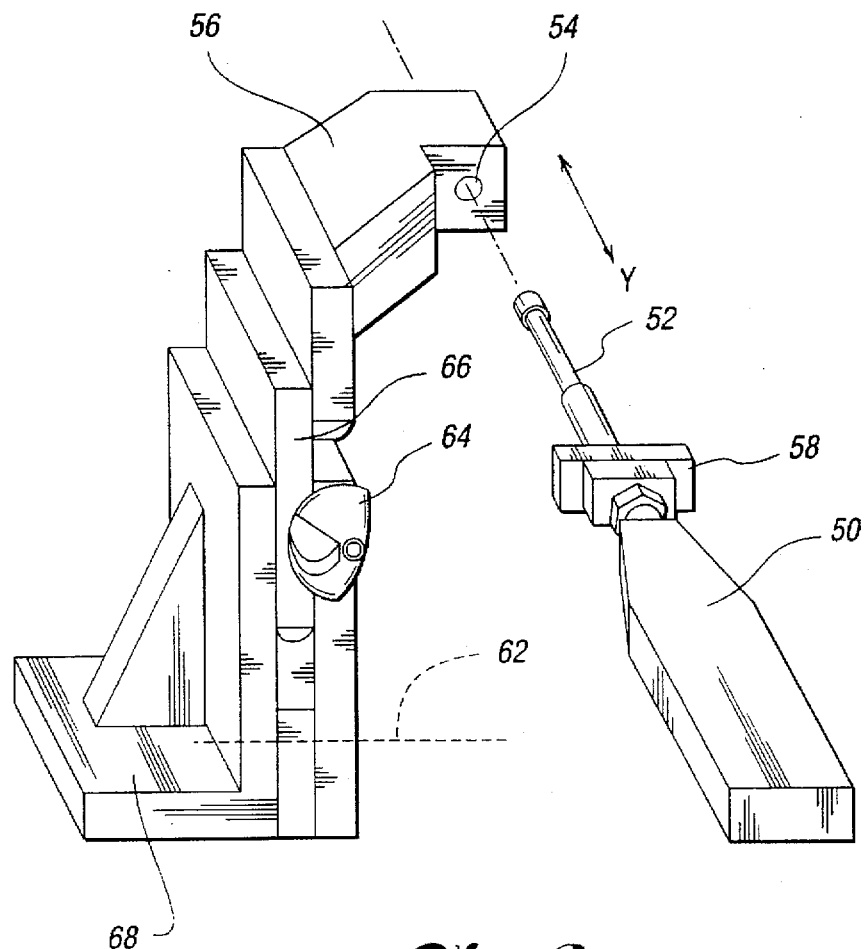
FIG. 2 is an isometric view showing in schematic form a digital indicator for measuring the so-called "wide line" dimensions at selected locations on a vehicle seat that is being checked.
Figure 3:
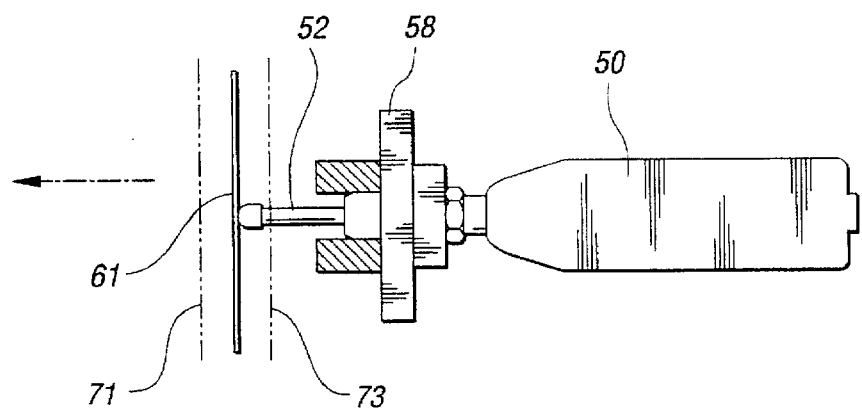
FIG. 3 is a view partly in section, as seen in the direction of the fore-and-aft vehicle center line, showing the digital indicator of FIG. 2.

FIG. 2 shows a digital indicator 50 with a plunger 52 which is adapted to be received in an opening 54 in a "wide line" check block 56. The digital indicator has a stop which serves as a wide line check, as indicated at 58. When the block 58 engages check block 56, the plunger 52, as seen in FIG. 3, will extend toward the seat and engage a point on the side of the seat as shown at 61. The digital reading indicated on the digital indicator 50 then will provide an accurate measurement of the distance of the seat at check point 61.

When check block 56 is not in use, it may be folded forward on a pivot axis 62, as seen in FIG. 2. When it is in its operative position as shown in FIG. 2, it may be held in place by a thumb lock 64 firmly against stationary support plate 66, which is secured to a base that is folded or otherwise secured to the seat buck surface plate.

FIG. 3 shows the tolerance limits at 71 and 73 for the side of the seat contacted by the plunger 52. Limit 71 is the narrow limit for the seat, and limit 73 is the wide limit for the seat. In FIG. 3, the seat side falls within the narrow and wide limits. The actual seat side position is recorded on the digital indicator 50.

Digital indicator 50 is initialized before the plunger 58 is placed in the wide line check block 58. This is done by inserting it into a zero gage that may be fixed to the seat buck surface plate. The zero gage comprises a first block with an aperture for receiving the plunger, and a second block spaced a predetermined distance from the first block, the plunger engaging the second block. The digital indicator then is set to a zero reading. When the digital indicator then is used, as indicated in FIG. 3, either plus readings or minus readings will be recorded by the digital indicator depending upon whether the seat dimension is wide or narrow relative to the design dimension.

Figure 4A:
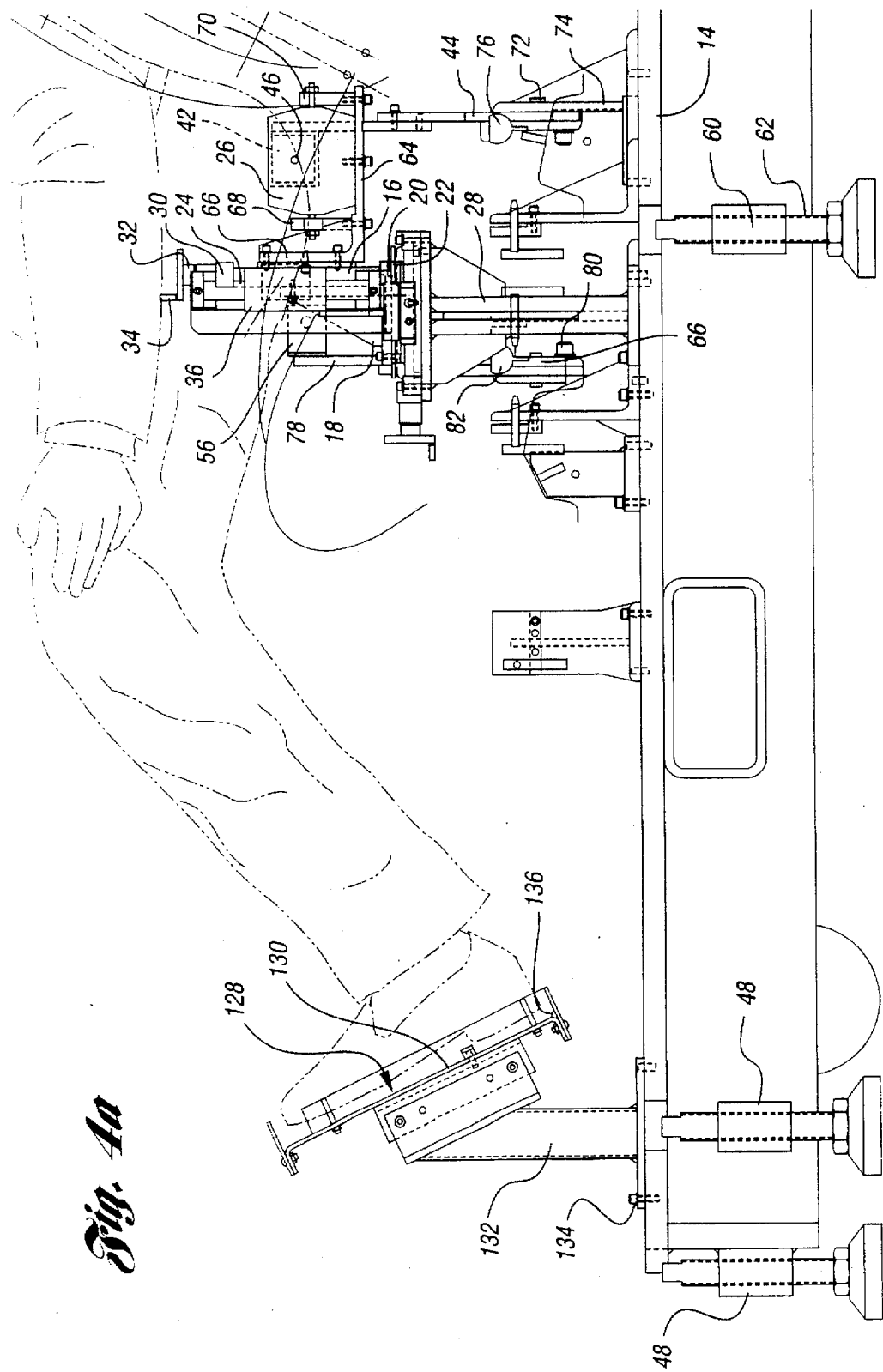
FIGS. 4a, 4b and 4c show a side elevation view of a front seat buck embodying the features of my invention.

Shown in FIG. 4a is an actual embodiment of the structure illustrated schematically in FIG. 1. The base plate 14, as seen in FIG. 4a, includes support pads 60 for leveling purposes, the adjustment being achieved by adjustment threads 62.

The light beam generator 26 in the embodiment shown in FIG. 4a is supported on platform 64 having a vertical support wall 66 which is bolted to the adjustable support 16. The light beam generator 26 is held in place by spaced support plates 68 and 70 secured to the platform 64. Target block 42, shown in phantom lines in FIG. 4a, is carried by the previously described support arm 44 which is pivoted at 72 to a bracket 74 secured to surface plate 14. A thumb lock element 76 holds the arm 44 in its vertical position when the light beam is being targeted.

Figure 4B:
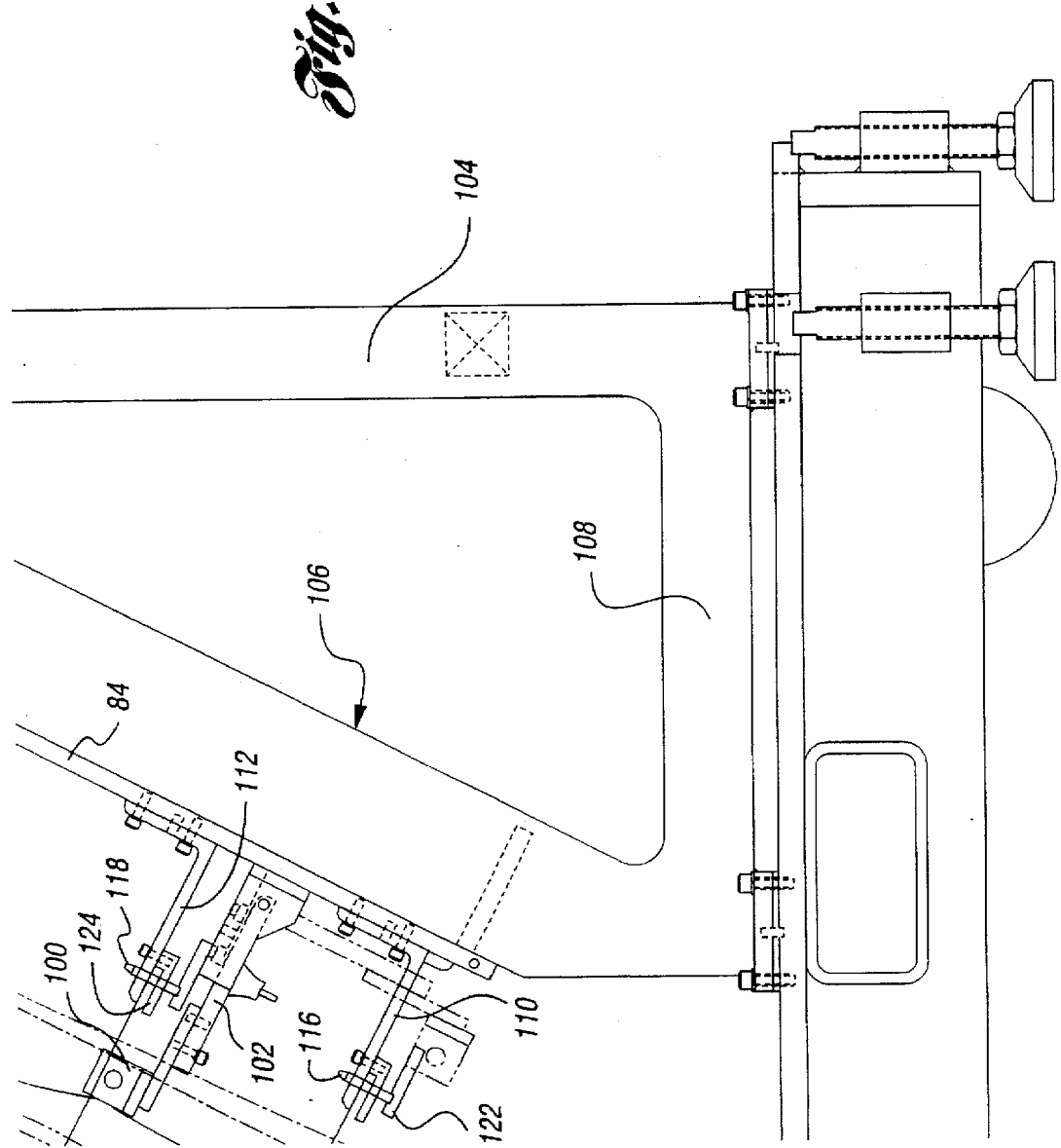
Figure 4C:
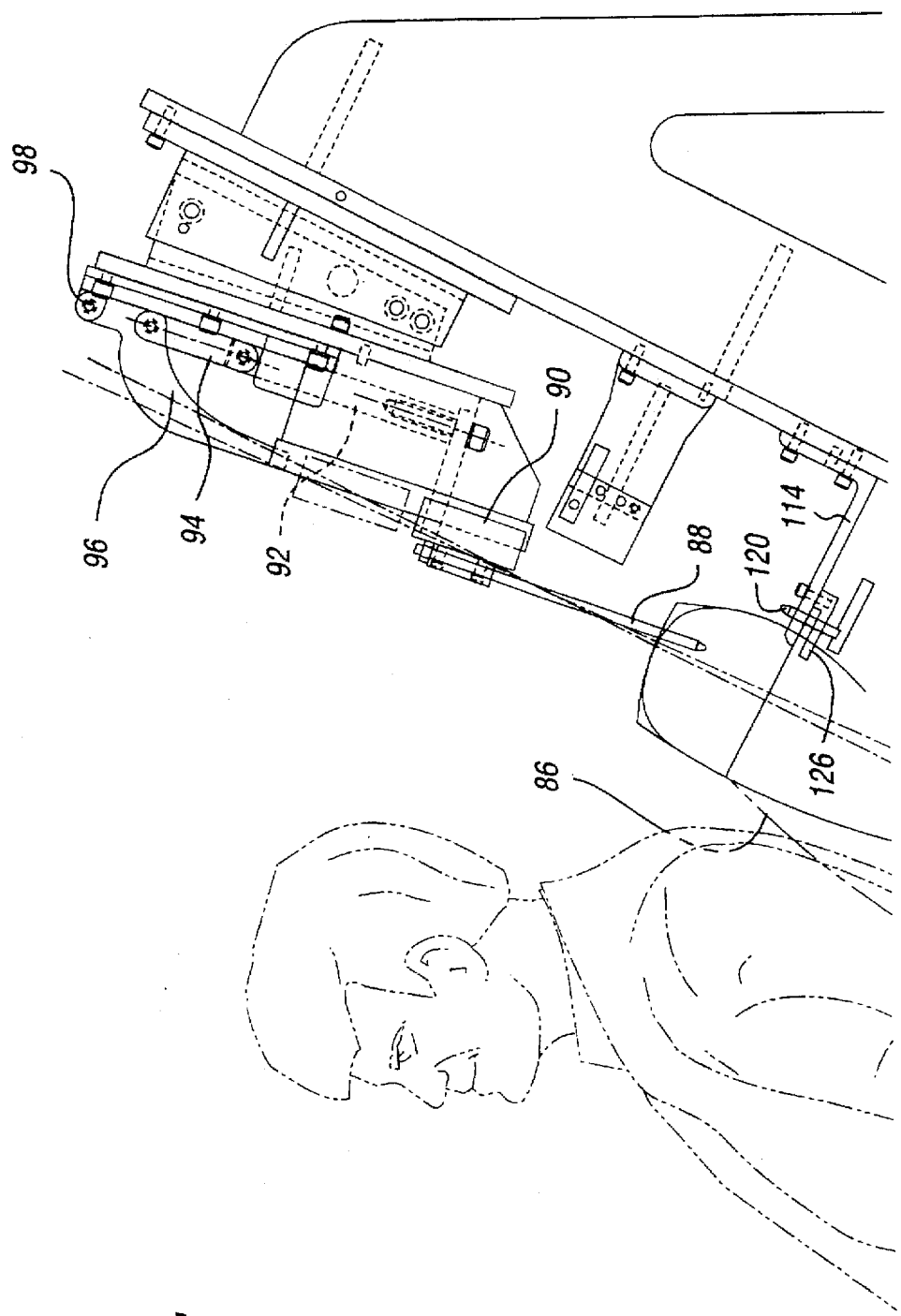

FIGS. 4a, 4b and 4c show the check block 56 located generally in phantom behind the support structure for the light beam generator. It is carried by an arm 78 which is pivoted at 80 to the bracket 66. A thumb lock 82 holds the arm 78 in a vertical position when the check block 56 is being used.

The seat back portion of the seat buck includes a base plate 84, as seen in FIGS. 4b and 4c. A seat back is schematically shown at 86 when it is positioned against the seat back portion of the seat buck. A pair of locating rods 88 carried by a slide block 90 is arranged at the upper portion of the plate 84 so that it can be engaged with headrest openings typically found on an automotive front passenger seat or driver seat. The slide block 90 is connected to an actuator rod 92, which in turn is connected by means of a toggle 94 to a clamping lever 96 pivoted at 98 on a stationary bracket secured to the plate 84. When the lever 96 is positioned as shown, the positioning rods 88 enter the openings of the headrest.

A check block 100 is supported on an arm 102 which is secured to a plate 84. This corresponds to the check block 56. It is adapted, as explained previously, to receive the probe of a vernier digital indicator described with reference to FIG. 3. The indicator is used in this way to measure the position of the seat back side relative to a reference point. The back frame, including the plate 84, is supported by a structural frame having a vertical part 104 and a part 106 which are joined together to form generally a triangle in the view of FIG. 4b, the part 106 supporting the plate 84. The base of the triangle 108 is bolted to the main surface plate 14.

Template supports 110, 112 and 114, seen in FIGS. 4b and 4c, extend perpendicularly with respect to the plate 84 and are secured to the plate 84 as indicated. They include template locator pins as shown at 116, 118 and 120 for locating a template that may be placed over the seat back 86. As will be seen in FIGS. 5a, 5b and 5c, which will be discussed subsequently, the templates are placed over the seat back to determine whether the contour of the seat back meets design specifications. The templates are held in place by brackets 122, 124 and 126. The templates span the seat back 86 and are held in place at each end as will be apparent in FIGS. 5b and 5c.

Secured to the left side of the surface plate 14, as seen in FIG. 4a, is a foot rest 28 corresponding to the foot rest of the floor pan of a vehicle passenger. compartment. The foot of a test dummy shown at 130 positions the dummy in the optimal position in accordance with design specifications. The foot rest 128 is supported by a bracket 132 which is secured by bolts 134 to the surface plate 14. The heel point for the dummy is shown at 136.

Figure 5B:
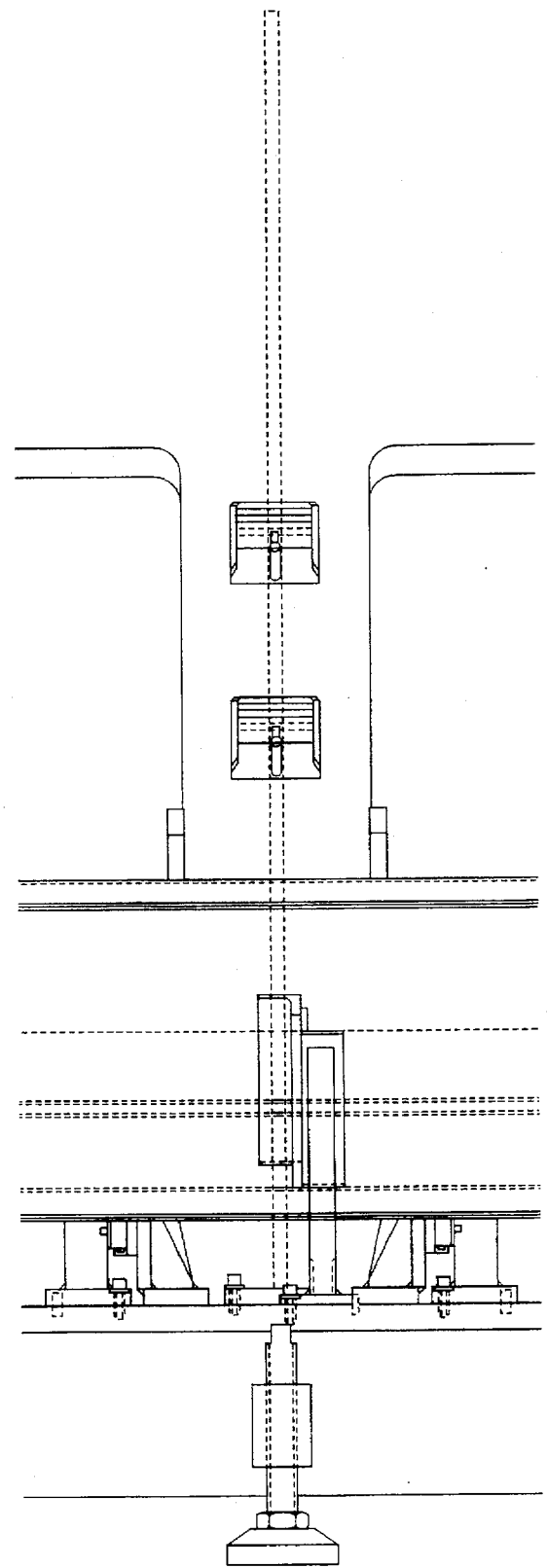
Figure 6:
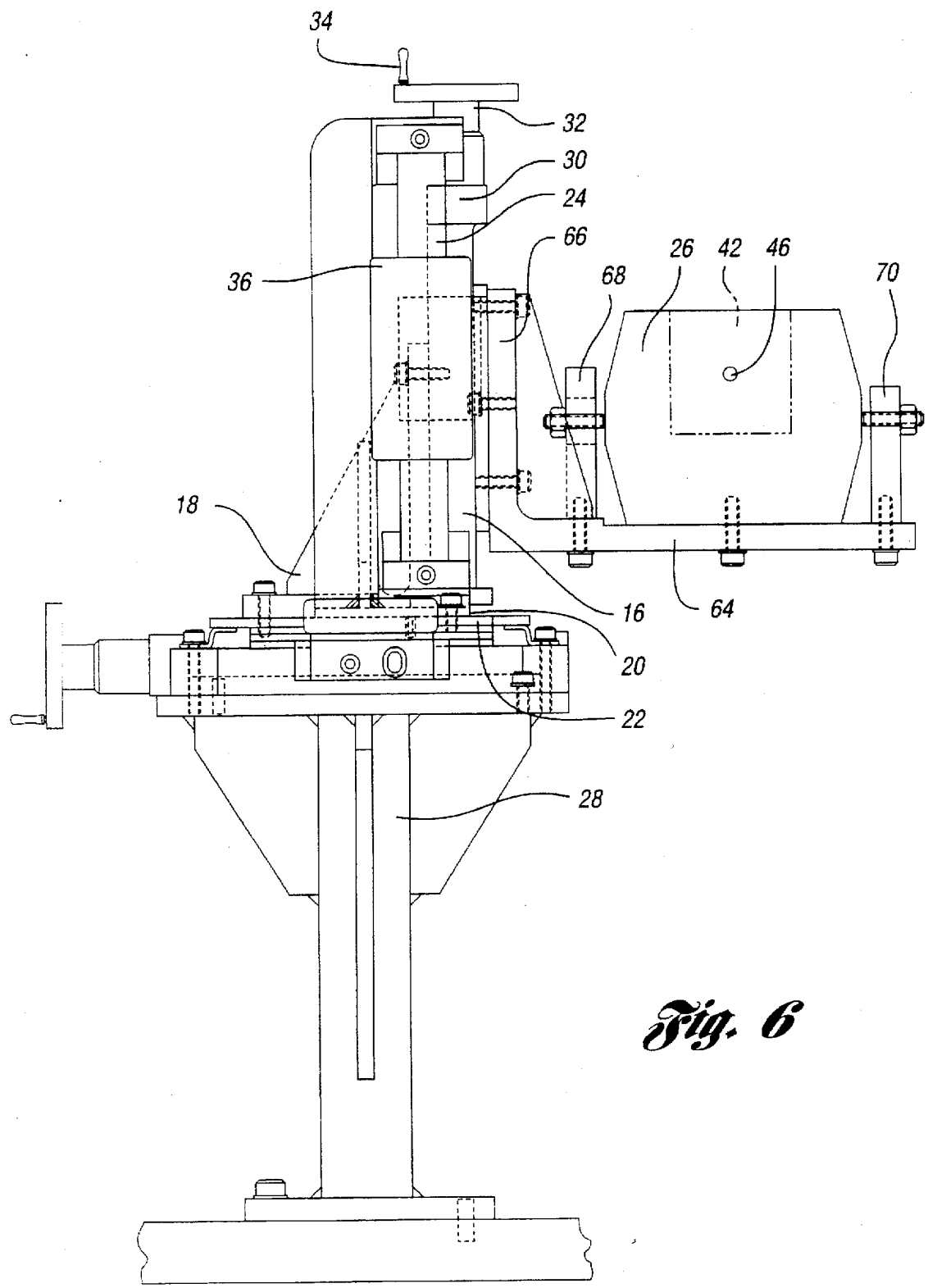
FIG. 6 is an enlarged view of the portion of FIG. 4a that illustrates the light beam generator and its supporting structure.

FIGS. 5a, 5b and 5c show a front elevation view of the buck structure shown in FIGS. 4a, 4b and 4c. It includes a location for a driver seat 136 and a front passenger seat 138. The light beam generator shown at 26 for the left side of the driver's seat has a corresponding light beam generator 26' at the right side of the front passenger seat. The mechanism for adjusting the light beam generator 26' may be identical to the adjustment mechanism for the light beam generator 26. It will not be described separately. Likewise, target block 42 at the left side of the driver's seat has a corresponding target block 42' at the right side of the passenger seat. Further, check block 56 at the left side of the driver's seat has a corresponding check block 56' at the right side of the passenger seat.

Template supports 110, 112 and 114 at the left side of the upright portion of the driver's seat have corresponding template supports 110', 112' and 114' at the right side of the passenger seat upright portion.

The locating rods 88 for the upright portion of the driver's seat have corresponding locator rods 88' for the passenger seat upright portion.

Figure 8A:
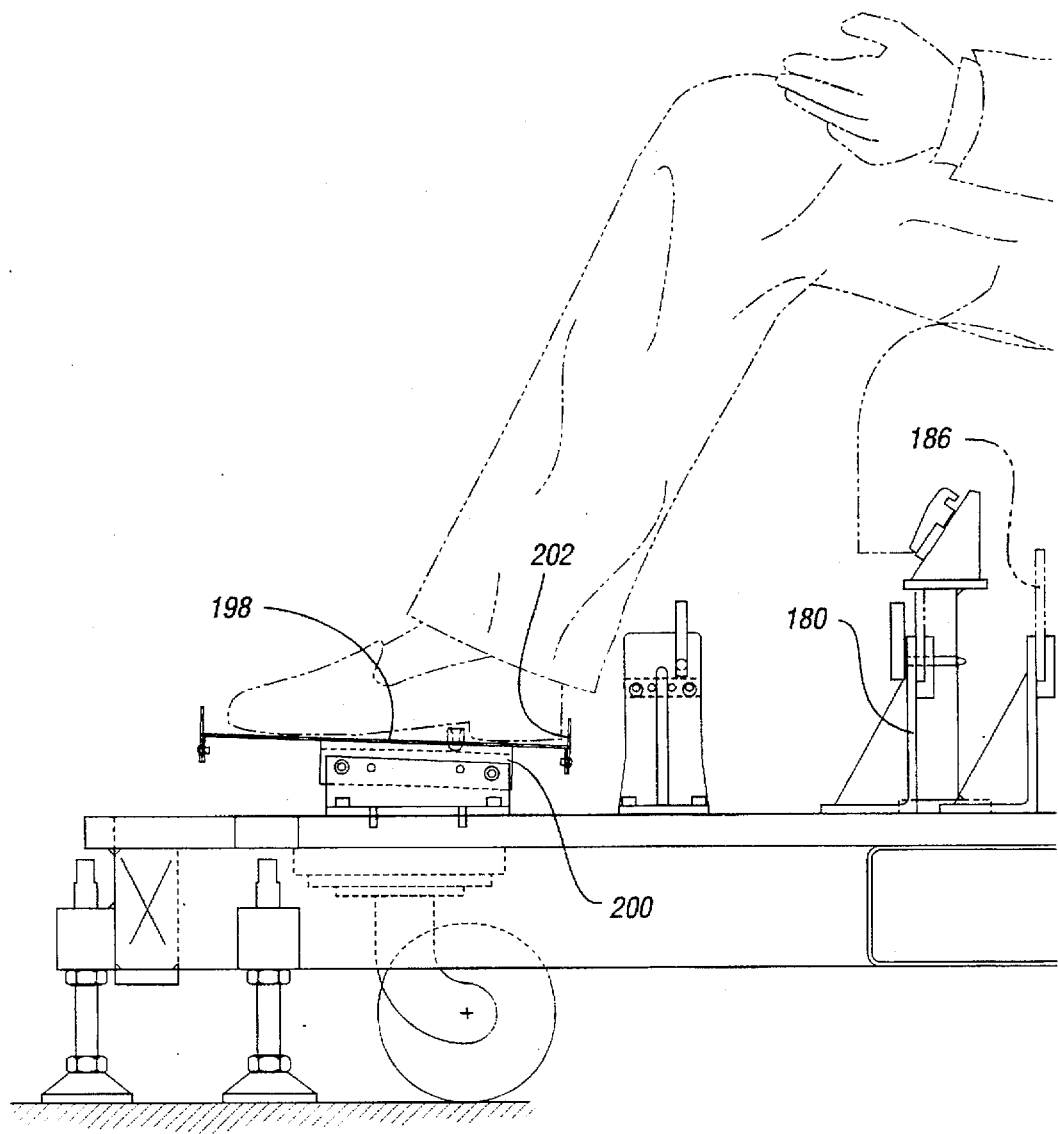
FIGS. 8a, 8b and 8c show a side elevation view of a rear seat buck having features that are common to the front seat buck of FIGS. 1–7, although it does not illustrate the light beam generator nor the generator mounting structure.
Figure 8B:
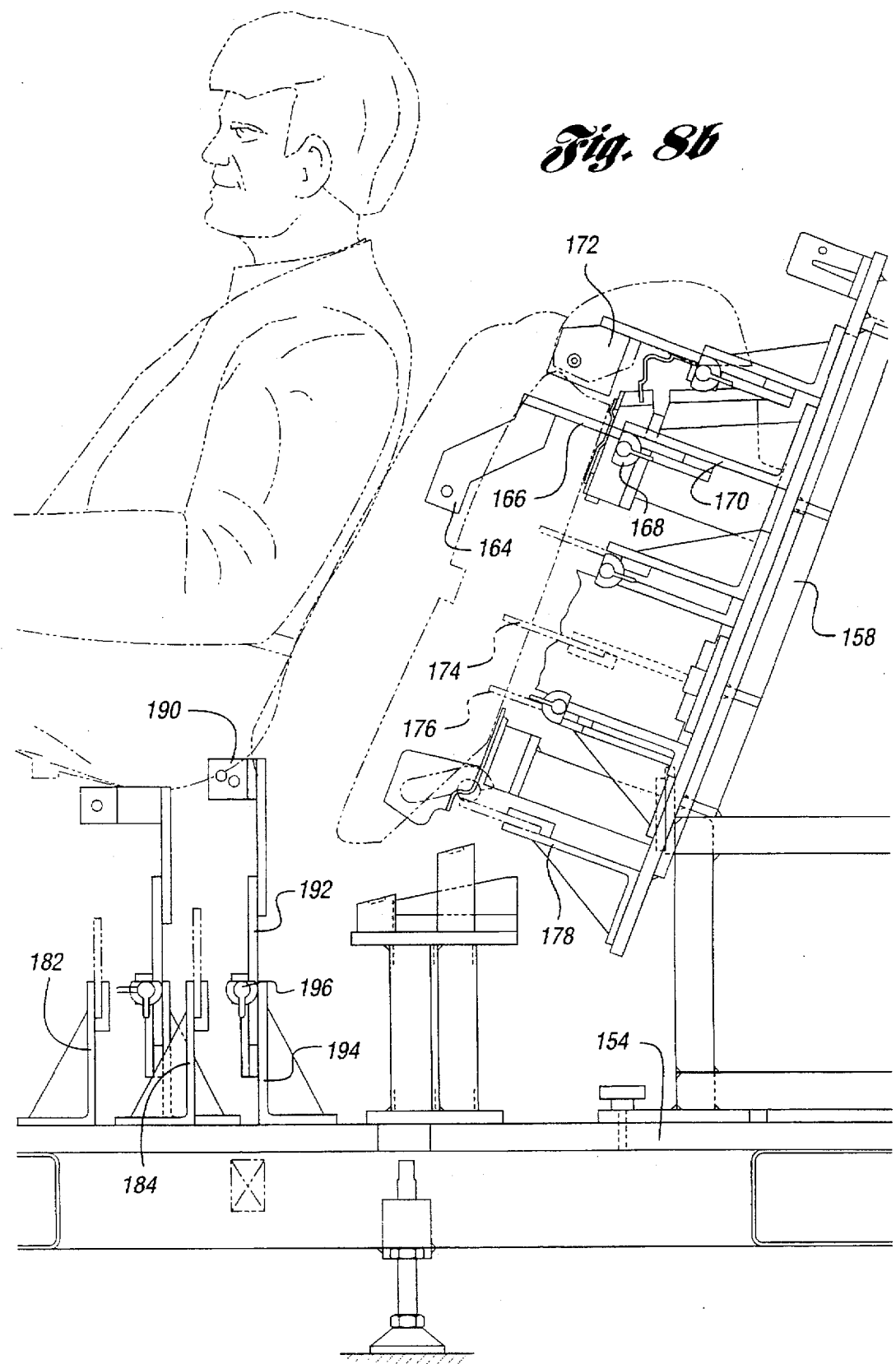
Figure 8C:
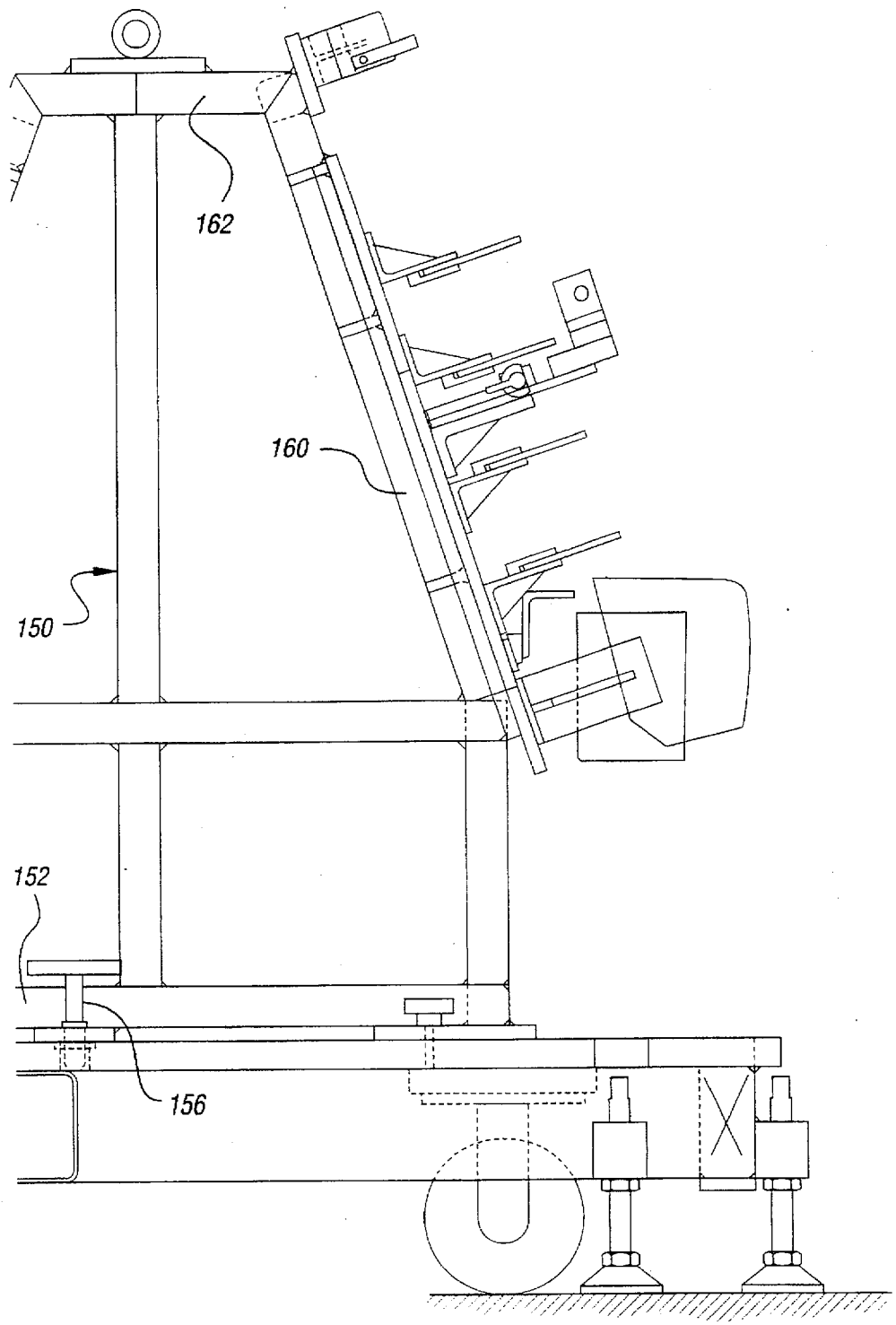

FIGS. 8a, 8b and 8c show a seat buck corresponding to the front seat buck described with reference to FIGS. 4a–7, but it is adapted for taking measurements on a rear seat for a vehicle passenger compartment. It includes a frame 150 having a base 152 which can be located on face plate 154 by a locator pin 156. Pin 156 can be inserted in a locator hole formed in the face plate to provide a zero reference data point.

The frame 150 includes a seat back support plate 158. The same support can be used for a check of a different type of seat, such as a station wagon seat, as distinct from a sedan seat. The frame includes a support plate 160 which has dimensions corresponding to the dimensions of plate 158. It will not be described separately. The top ends of the plates 158 are joined together by a cross member 162 as shown in FIG. 8c.

A wide line check block 164, corresponding to the wide line check block described with reference to the seat buck embodiment for a front vehicle seat, is carried by an arm 166 which is held in place by a thumb lock element 168 and supported by a support member 170 which in turn is secured to the seat back plate 158. A corresponding wide line check block is shown at 172 at a different location. Corresponding wide line check blocks are carried by arms 174 and 176.

A template support corresponding to the template supports described with reference to the front seat buck is shown in FIG. 8b at 178.

FIGS. 8a and 8b show a plurality of template supports as seen at 180, 182 and 184. These correspond to the template supports for the front seat portion described previously. They support one end of templates illustrated in phantom in FIG. 8a at 186 for checking the contour of the rear seat. Corresponding template supports are provided at the right-hand side of the rear seat and are supported by the plate 154.

The light beam target block described previously with reference to the front seat buck has a counterpart light beam target buck shown in FIG. 8b at 190. It is carried by support arm 192, which is pivotally mounted on bracket 194 and held in place by thumb lock 196 on the bracket 194. When the target block is not in use, it is pivoted forward to allow the light beam emitted by the light beam generator to illuminate a point on the side of the rear seat corresponding to the H-point. The light beam generator is not illustrated in FIG. 8b, but it would be located on the side of the face plate 154 at the left of the rear seat.

A foot plate 198 for the rear seat passenger is carried by a supporting bracket 200, which in turn is bolted to the face plate 154. The heel point for the foot plate 198 is shown at 202. The foot plate 198 would correspond to the floor pan at the rear of the vehicle passenger compartment.

In using the seat buck for the front seat or the rear seat, it is possible by means of the light beam with a digital readout to verify each check point location on a vehicle seat, thereby providing an opportunity to make manufacturing adjustments in dimensions with a minimal amount of inspection time and with improved accuracy. The seat buck simulates a perfect vehicle passenger compartment and is capable of measuring variable dimensions for both the H-point location as well as the vertical wide line measurements. Both the vehicle seat H-point check and the wide line measurements can be obtained, using the procedure described, each time the seat is assembled on the seat buck.

If desired, the rear seat buck may be provided with simulated trim panels such as a package tray or side trim for the rear passenger compartment, the quarter panel trim and other passenger compartment features so that clearances between the seat assembled in the seat buck relative to these interior passenger compartment elements can readily be measured and checked against a design standard.

Having described the preferred embodiments of my invention, what I claim and desire to secure by U.S. Letters Patent is:

1. A method for checking dimensions of an automotive seat using a seat buck that simulates a vehicle passenger compartment with optimum dimensions, said buck having a surface plate with seat supporting structure, said method comprising the steps of:

mounting a test seat on said supporting structure, said test seat having a hip point location corresponding to the hip axis of a seat occupant;

placing a target block adjacent one side of said seat in proximity to said hip point location;

adjusting a light beam generator supported on said surface plate for movement in the directions of first and second coordinate axes parallel to the passenger compartment centerplane;

aiming a light beam generated by said light beam generator at said target block and adjusting the position of said light beam generator in said directions of said coordinate axes until said light beam illuminates a target point on said target block corresponding to a predetermined target point and zeroing digital readouts of said first and second coordinates;

removing said target block from the path of said light beam; and measuring the displacement of said hip point location on said seat from said target point by adjusting said light beam generator in the direction of said coordinate axes until said hip point and said target point coincide, and recording the adjustment of said light beam generator.

2. The method set forth in claim 1 including the step of measuring distances in a transverse direction from check blocks supported on said surface plate to characteristic check points on said seat.

3. The method set forth in claim 2 wherein said distances are measured in a third coordinate axis direction perpendicular to a fore-and-aft plane defined by said first and second coordinate axes and comparing said distances in a third axis direction with predetermined error tolerance specifications to detect dimensional errors.

4. The method set forth in claim 3 including the step of measuring seat contour of said test seat by placing templates with specified contours on template supports mounted on said surface plate in each side of said test seat and comparing actual test seat contours with said specified contours.

5. A seat buck for measuring the dimensions of a test seat for an automobile passenger compartment comprising a surface plate, said seat having an H-point corresponding to the hip axis of a seat occupant, support structure on said surface plate for mounting a test seat in a position corresponding to an optimum position within a vehicle passenger compartment;

a light beam generator mounted on said surface plate laterally with respect to said test seat, means for adjusting said light beam generator in each of two coordinate axis directions;

a light beam target block mounted on said surface block and having a light beam target point thereon, said target point being illuminated by a light beam generated by said light beam generator when the latter is adjusted to an initialized reference position;

means for moving said target block out of the path of said light beam after said reference position is established; and means for measuring displacement of said H-point relative to said target point whereby correction in the seat dimensions may be made to ensure conformance of a seat design to design specifications.

* * * * *